(12) United States Patent
Shimizu et al.

(10) Patent No.: US 6,668,021 B2
(45) Date of Patent: *Dec. 23, 2003

(54) ENCODING APPARATUS

(75) Inventors: Tetsuya Shimizu, Yokohama (JP); Yoshitaka Takeuchi, Tokyo (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/021,267

(22) Filed: Feb. 10, 1998

(65) Prior Publication Data

US 2001/0040923 A1 Nov. 15, 2001

Related U.S. Application Data

(62) Division of application No. 08/653,975, filed on May 28, 1996, now Pat. No. 5,748,245, which is a continuation of application No. 08/218,637, filed on Mar. 28, 1994, now abandoned.

(30) Foreign Application Priority Data

| Mar. 29, 1993 | (JP) | 5-093560 |
| Mar. 29, 1993 | (JP) | 5-093561 |
| Sep. 17, 1993 | (JP) | 5-255110 |

(51) Int. Cl.⁷ ............................................. H04N 7/12
(52) U.S. Cl. ..................................................... 375/240.2
(58) Field of Search .......................... 348/390, 400–403, 348/405, 407–412, 419, 420; 375/240, 240.01, 240.03, 240.07, 240.12–240.16, 240.18, 240.2, 240.24; 382/232, 236, 238, 248, 250; 386/81, 111, 116; H04N 7/12, 7/30

(56) References Cited

U.S. PATENT DOCUMENTS

| 4,797,742 A | * | 1/1989 | Sugiyama et al. | 348/407 |
| 4,984,076 A | | 1/1991 | Watanabe et al. | 358/133 |
| 5,006,931 A | | 4/1991 | Shirota | 348/408 |
| 5,073,821 A | * | 12/1991 | Juri | 348/405 |
| 5,136,377 A | | 8/1992 | Johnston et al. | 348/419 |
| 5,144,426 A | | 9/1992 | Tanaka et al. | 348/409 |
| 5,196,933 A | | 3/1993 | Henot | 348/419 |
| 5,270,813 A | * | 12/1993 | Puri et al. | 375/240.15 |
| 5,333,012 A | * | 7/1994 | Singhal et al. | 348/405 |
| 5,337,049 A | | 8/1994 | Shimoda | 348/490 |
| 5,469,213 A | | 11/1995 | Koga et al. | 348/405 |
| 5,737,481 A | * | 4/1998 | Gushima et al. | 386/116 |
| 5,793,927 A | * | 8/1998 | Lane | 386/111 |
| 6,014,493 A | * | 1/2000 | Shimoda | 386/111 |
| 6,028,726 A | * | 2/2000 | Yanagihara | 386/81 |

FOREIGN PATENT DOCUMENTS

| JP | 02-183668 | 7/1990 |
| JP | 02-222394 | 9/1990 |
| JP | 03-102988 | 4/1991 |
| JP | 04-120888 | 4/1992 |
| JP | 05-068172 | 3/1993 |

OTHER PUBLICATIONS

C. Yamamitsu et al., "An Experimental Study For A Home–Use Digital VTR," IEEE Trans. on CE, vol. 35, No. 3, pp. 450–457, Aug. 1989.

* cited by examiner

Primary Examiner—Richard Lee
(74) Attorney, Agent, or Firm—Fitzpatrick, Cella, Harper & Scinto

(57) ABSTRACT

An encoding apparatus includes: (a) input circuitry for inputting image data including luminance component data and chrominance component data; (b) block forming circuitry for dividing the image data input by input circuitry into blocks so as to divide the respective component data into the blocks separately, each of the blocks being formed by a same predetermined amount of the input image data; and (c) encoding circuitry for encoding the input image data divided into the blocks by the block forming circuitry. The encoding circuitry includes code amount control circuitry for controlling a code amount of encoded data on a unit basis of a predetermined number of blocks, the predetermined number of blocks being formed so as to include at least one of the blocks of each type of component data. In case the code amount of encoded data on a unit basis of the predetermined number of blocks exceeds a predetermined amount, the code amount control circuitry weights the chrominance component data more than the luminance component data in deleting codes of excess code amount over the predetermined amount.

10 Claims, 18 Drawing Sheets

FIG. 2
PRIOR ART

LOW FREQUENCY SIDE

| 0 | 1 | 5 | 6 | 14 | 15 | 27 | 28 |
|---|---|---|---|----|----|----|----|
| 2 | 4 | 7 | 13 | 16 | 26 | 29 | 42 |
| 3 | 8 | 12 | 17 | 25 | 30 | 41 | 43 |
| 9 | 11 | 18 | 24 | 31 | 40 | 44 | 53 |
| 10 | 19 | 23 | 32 | 39 | 45 | 52 | 54 |
| 20 | 22 | 33 | 38 | 46 | 51 | 55 | 60 |
| 21 | 34 | 37 | 47 | 50 | 56 | 59 | 61 |
| 35 | 36 | 48 | 49 | 57 | 58 | 62 | 63 |

HIGH FREQUENCY SIDE

FIG.14

| CLASS / SIGNAL | 1 | 2 | 3 | 4 |
|---|---|---|---|---|
| Y | T0 | T1 | T2 | T3 |
| Cr | T1 | T2 | T3 | T3 |
| Cb | T2 | T3 | T3 | T3 |

FIG.15

| QUANTIZATION NO. \ FREQUENCY BAND | 1 | 2 | 3 | 4 |
|---|---|---|---|---|
| 0 | 1/8 | 1/16 | 1/16 | 1/16 |
| 1 | 1/8 | 1/8 | 1/16 | 1/16 |
| 2 | 1/8 | 1/8 | 1/8 | 1/16 |
| 3 | 1/8 | 1/8 | 1/8 | 1/8 |
| 4 | 1/4 | 1/8 | 1/8 | 1/8 |
| 5 | 1/4 | 1/4 | 1/8 | 1/8 |
| 6 | 1/4 | 1/4 | 1/4 | 1/8 |
| 7 | 1/4 | 1/4 | 1/4 | 1/4 |
| 8 | 1/2 | 1/4 | 1/4 | 1/4 |
| 9 | 1/2 | 1/2 | 1/4 | 1/4 |
| 10 | 1/2 | 1/2 | 1/2 | 1/4 |
| 11 | 1/2 | 1/2 | 1/2 | 1/2 |
| 12 | 1 | 1/2 | 1/2 | 1/2 |
| 13 | 1 | 1 | 1/2 | 1/2 |
| 14 | 1 | 1 | 1 | 1/2 |
| 15 | 1 | 1 | 1 | 1 |

TABLE 0 ( T0 )

FIG. 16

| QUANTIZATION NO. \ FREQUENCY BAND | 1 | 2 | 3 | 4 |
|---|---|---|---|---|
| 0 | 1/16 | 1/16 | 1/16 | 1/16 |
| 1 | 1/8 | 1/16 | 1/16 | 1/16 |
| 2 | 1/8 | 1/8 | 1/16 | 1/16 |
| 3 | 1/8 | 1/8 | 1/8 | 1/16 |
| 4 | 1/8 | 1/8 | 1/8 | 1/8 |
| 5 | 1/4 | 1/8 | 1/8 | 1/8 |
| 6 | 1/4 | 1/4 | 1/8 | 1/8 |
| 7 | 1/4 | 1/4 | 1/4 | 1/8 |
| 8 | 1/4 | 1/4 | 1/4 | 1/4 |
| 9 | 1/2 | 1/4 | 1/4 | 1/4 |
| 10 | 1/2 | 1/2 | 1/4 | 1/4 |
| 11 | 1/2 | 1/2 | 1/2 | 1/4 |
| 12 | 1/2 | 1/2 | 1/2 | 1/2 |
| 13 | 1 | 1/2 | 1/2 | 1/2 |
| 14 | 1 | 1 | 1/2 | 1/2 |
| 15 | 1 | 1 | 1 | 1/2 |

TABLE 1 (T1)

FIG. 17

| QUANTIZATION NO. \ FREQUENCY BAND | 1 | 2 | 3 | 4 |
|---|---|---|---|---|
| 0 | 1/16 | 1/16 | 1/16 | 1/32 |
| 1 | 1/16 | 1/16 | 1/16 | 1/16 |
| 2 | 1/8 | 1/16 | 1/16 | 1/16 |
| 3 | 1/8 | 1/8 | 1/16 | 1/16 |
| 4 | 1/8 | 1/8 | 1/8 | 1/16 |
| 5 | 1/8 | 1/8 | 1/8 | 1/8 |
| 6 | 1/4 | 1/8 | 1/8 | 1/8 |
| 7 | 1/4 | 1/4 | 1/8 | 1/8 |
| 8 | 1/4 | 1/4 | 1/4 | 1/8 |
| 9 | 1/4 | 1/4 | 1/4 | 1/4 |
| 10 | 1/2 | 1/4 | 1/4 | 1/4 |
| 11 | 1/2 | 1/2 | 1/4 | 1/4 |
| 12 | 1/2 | 1/2 | 1/2 | 1/4 |
| 13 | 1/2 | 1/2 | 1/2 | 1/2 |
| 14 | 1 | 1/2 | 1/2 | 1/2 |
| 15 | 1 | 1 | 1/2 | 1/2 |

TABLE 2 (T2)

FIG. 18

| FREQUENCY BAND / QUANTIZATION NO. | 1 | 2 | 3 | 4 |
|---|---|---|---|---|
| 0 | 1/16 | 1/16 | 1/32 | 1/32 |
| 1 | 1/16 | 1/16 | 1/16 | 1/32 |
| 2 | 1/16 | 1/16 | 1/16 | 1/16 |
| 3 | 1/8 | 1/16 | 1/16 | 1/16 |
| 4 | 1/8 | 1/8 | 1/16 | 1/16 |
| 5 | 1/8 | 1/8 | 1/8 | 1/16 |
| 6 | 1/8 | 1/8 | 1/8 | 1/8 |
| 7 | 1/4 | 1/8 | 1/8 | 1/8 |
| 8 | 1/4 | 1/4 | 1/8 | 1/8 |
| 9 | 1/4 | 1/4 | 1/4 | 1/8 |
| 10 | 1/4 | 1/4 | 1/4 | 1/4 |
| 11 | 1/2 | 1/4 | 1/4 | 1/4 |
| 12 | 1/2 | 1/2 | 1/4 | 1/4 |
| 13 | 1/2 | 1/2 | 1/2 | 1/4 |
| 14 | 1/2 | 1/2 | 1/2 | 1/2 |
| 15 | 1 | 1/2 | 1/2 | 1/2 |

TABLE 3 ( T3 )

ENCODING APPARATUS

This application is a division of Application Ser. No. 08/653,975, filed May 28, 1996, now U.S. Pat. No. 5,748,245, issued May 5, 1998, which is a continuation of Application Ser. No. 08/218,637, filed Mar. 28, 1994, now abandoned.

BACKGROUND OF THE INVENTION

1. Field of the Invention

The present invention relates to an encoding apparatus for encoding input information data, and more particularly to an encoding apparatus encoding input information data while controlling code quantity of encoded information data.

2. Related Background Art

Referring to FIG. 1, prior art encoding used in transmitting or recording digital image information such as a television signal is explained.

FIG. 1 illustrates an example where digital data are grouped into two-dimensional blocks each consisting of vertical M×horizontal N pixels (where M and N are integers) in one frame of a television image is processed by an orthogonal conversion and variable length encoding.

In FIG. 1, image data for pixels on a screen is applied to an input unit 1 and the input image data is grouped into M×N two-dimensional blocks of image data by a grouping circuit 2, and the pixel data is converted to orthogonally converted block data 5 representing M×N frequency components by an orthogonal conversion circuit 4.

Then, the orthogonally converted block data 5 is supplied to a quantization circuit 6 where quantized data is produced and it is supplied to a variable length encoding circuit 8 where it is encoded with variable length.

The variable length encoding circuit 8 rearrange each of the orthogonally converted blocks by zig-zag scanning coefficients from a low frequency end to high frequency end of frequency components. For example, where one orthogonally converted block consists of 8×8 data, the zig-zag scan is, in many cases, conducted in the order shown in FIG. 2. The variable length encoding is conducted to data train representing the one-dimensional frequency components.

The encoded data 10 is formatted by a formatter 11 and the formatted data is outputted from an output unit 14 for transmission or recording.

The code quantity of the data thus encoded is limited depending on a capacity of a medium used for the transmission or recording.

In a prior art method for controlling the code quantity, the code quantity for each orthogonally converted block stored in a buffer 9 or for a plurality of orthogonally converted blocks (hereinafter referred to as a code quantity control block) is counted by a code quantity calculation circuit 12 so that the quantization is conducted with coefficients of a quantization table which meets the object.

When an overflow occurs by failing to suppress to the desired code quantity by an existing quantization table, the code quantity is reduced in the process of formatting by deleting the coefficients in each orthogonally converted blocks as required in the order starting from the high frequency end in which the affect to the decoded image is less.

Assuming that a unit for the code quantity control comprises three orthogonally converted blocks and a run-length Huffman encoding method is used in which the coefficients are classified into zero and non-zero significant coefficients, and a code is defined by a combination of the number of consecutive zero coefficients starting from the low frequency end and significant coefficients following thereto, and an EOB (end of block) code is added following to the last significant coefficient in the block to omit the zero coefficients in the high frequency region, the code quantity control is conducted in such a manner that the formatting is conducted sequentially from the first block as shown in FIGS. 3A, 3B and 3C, and when the target code quantity is reached at the third block from the last, the EOB code is added.

In FIGS. 3A to 3C, the coefficients in a hatched area of solid line blocks represent those coefficients which will be zeros following to the last significant coefficient when they are rearranged in the orthogonally converted block from the low frequency end to the high frequency end. The coefficients in the high frequency region of the orthogonally concerted block sectioned by broken lines represent those coefficients which will be deleted by the code quantity control.

When such a code quantity control method is used, frequency components in some orthogonally converted blocks in relatively low frequency region may be cut away. In addition, it occurs unevenly among the orthogonally converted blocks in the code quantity contort block. As a result, when the transmission or recording is conducted, the decoded image includes deterioration of image quality such as a block distortion and the reproduction of an image which is close to an original image cannot be attained.

The code quantity control block frequently comprises orthogonally converted blocks representing different signals components such as a block representing a luminance signal and a block representing a color difference signal. Accordingly, when the code quantity is to be reduced, it is necessary to conduct weighting for a visual sense characteristic of human being to the orthogonally converted blocks representing the respective signal components.

SUMMARY OF THE INVENTION

In the light of the above, it is an object of the present invention to provide an encoding apparatus which prevents encoded data which will not be transmitted because of an overflow caused during the encoding of information data from being concentrated in particular blocks to permit the reproduction of information data which is close to the original information data from the decoded data after transmission or recording. (For example, where the information data is image data, the deterioration of image quality such as block distortion is prevented.)

To achieve the above object, in one aspect of the invention, there is provided an encoding apparatus comprising input means for supplying sampled information data, block forming means for forming blocks of information data supplied by said input means, encoding means for encoding information data outputted from said block forming means, detection means for detecting code quantity of encoded data derived by consolidating and encoding said blocks, one-dimension processing means for applying one-dimension processing to the encoded data of said blocks, and deletion means for deleting the encoded data in accordance with the encoded data processed by said one-dimension processing means in accordance with the output of said detection means.

In another aspect of the invention, there is provided an encoding apparatus comprising input means for supplying sampled image data, encoding means for encoding the image data, detection means for detecting code quantity of the encoded data for each predetermined unit, deletion means for deleting the encoded data in accordance with the output of said detection means, and control means for controlling the deletion process by said deletion means in accordance with signal components of the image data.

In accordance with a further aspect of the invention, there is provided an encoding apparatus for forming blocks of input information data, encoding the formed blocks of information data and writing the encoded data in a transmission format having a predetermined area provided for each block, comprising memory means for storing encoded data which overflows the predetermined area provided for the block when the encoded data is written in the transmission format, measurement means for measuring the encoded data which overflows the predetermined area for each unit comprising a plurality of said blocks, and control means for stopping the transmission of the encoded data stored in said memory means in response to the output of said measurement means.

Other objects and advantages of the invention will become apparent from the following detailed description taken in conjunction with the appended claims.

BRIEF DESCRIPTION OF THE DRAWINGS

FIG. 2 illustrates zig-zag scanning when frequency components are scanned from a low frequency end to a high frequency end in an orthogonally converted block.

FIG. 14 illustrates a selection of quantization table for each class for Y/Cr/Cb in the second embodiment, FIG. 15 shows a quantization table for each band for quantized numbers in the second embodiment, FIG. 16 shows a quantization table for each band for quantized numbers in the second embodiment, FIG. 17 shows a quantization table for each band for quantized numbers in the second embodiment, and FIG. 18 shows a quantization table for each band for quantized numbers in the second embodiment.

DETAILED DESCRIPTION OF THE PREFERRED EMBODIMENTS

A first embodiment of the image encoding apparatus of the present invention is now explained with reference to the drawings.

Figure 1:
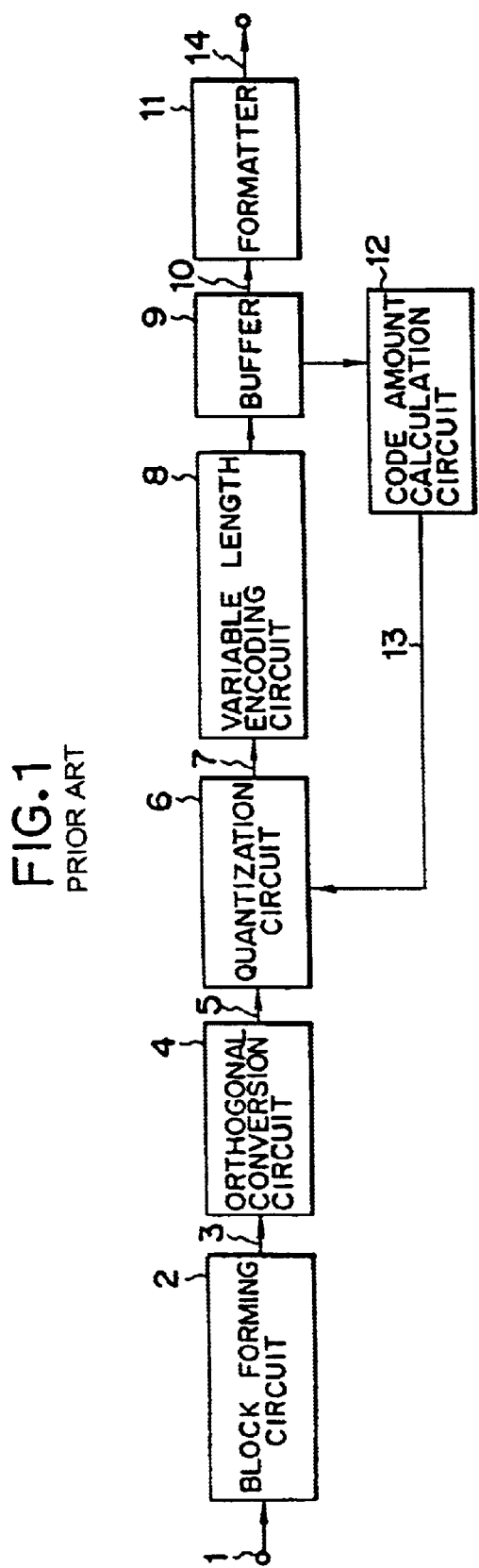
FIG. 1 shows a block diagram of a prior art image encoding apparatus.
Figure 3A:
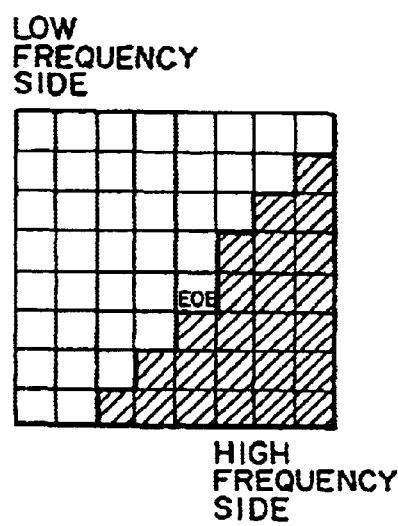
FIGS. 3A to 3C illustrate data which are deleted in a prior art code quantity control.
Figure 3B:
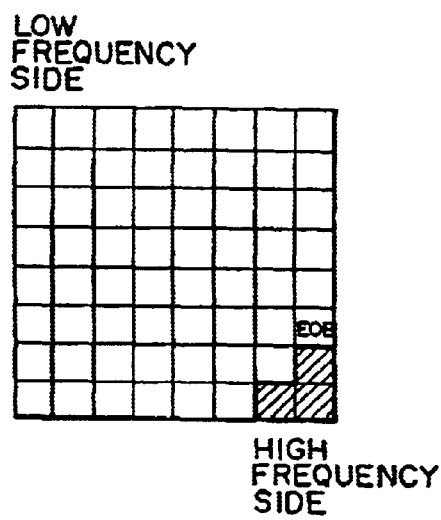
Figure 3C:
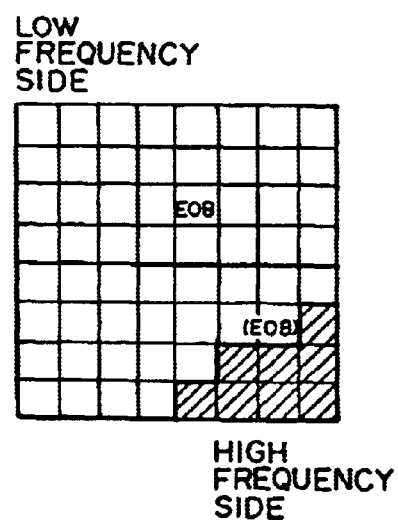
Figure 4:
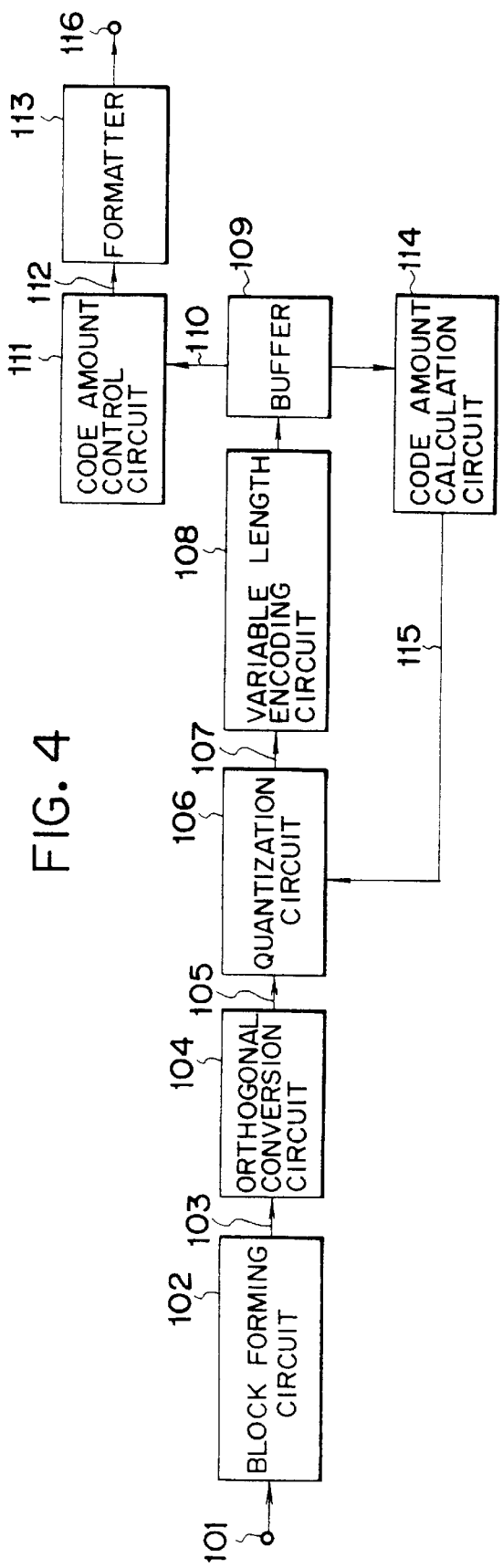
FIG. 4 shows a block diagram of an image encoding apparatus in accordance with one embodiment of the present invention.

FIG. 4 shows a block diagram of an image encoding apparatus in accordance with the first embodiment. In the present embodiment, in order to transmit or record an image of a television signal, the orthogonal conversion and the variable length encoding are conducted for each 8×8 pixel block, although the present invention is not limited to the block size of 8×8. The following description is made in conjunction with the block diagram of FIG. 4.

In FIG. 4, digital image data of a television signal is supplied from an input unit 101, and the input image data is two-dimensionally grouped into blocks each consisting of 8×8 pixels. They are further grouped into code quantity control blocks each consisting of a plurality of blocks for use in subsequent code quantity control and formatting.

Thereafter, the data 103 is converted to data 105 representing frequency components by an orthogonal conversion circuit 104 and it is quantized by a quantization circuit 106. The quantized data 107 is rearranged by zig-zag scan by a variable length encoding circuit 108 in the number sequence shown in FIG. 2 from the low frequency end to the high frequency end.

Then, it is run-length Huffman encoded in which the number of consecutive zeros (run length) and non-zero significant coefficients following thereto are combined and codes are assigned thereto in accordance with frequencies of occurrence.

A quantization table of the quantization circuit 106 is switched for each code quantity control block. Namely, a quantity of encoded data after the variable length encoding stored in a buffer 109 for each code quantity control block is calculated by a code quantity calculation circuit 114, and an appropriate quantization table is selected to suppress the quantity of code generated.

However, even with the quantization table capable of most suppressing the quantity of code generated, an overflow may occur in the formatting for the transmission or recording because the quantity of code generated cannot be suppressed to the code quantity defined by the format.

Figure 5:
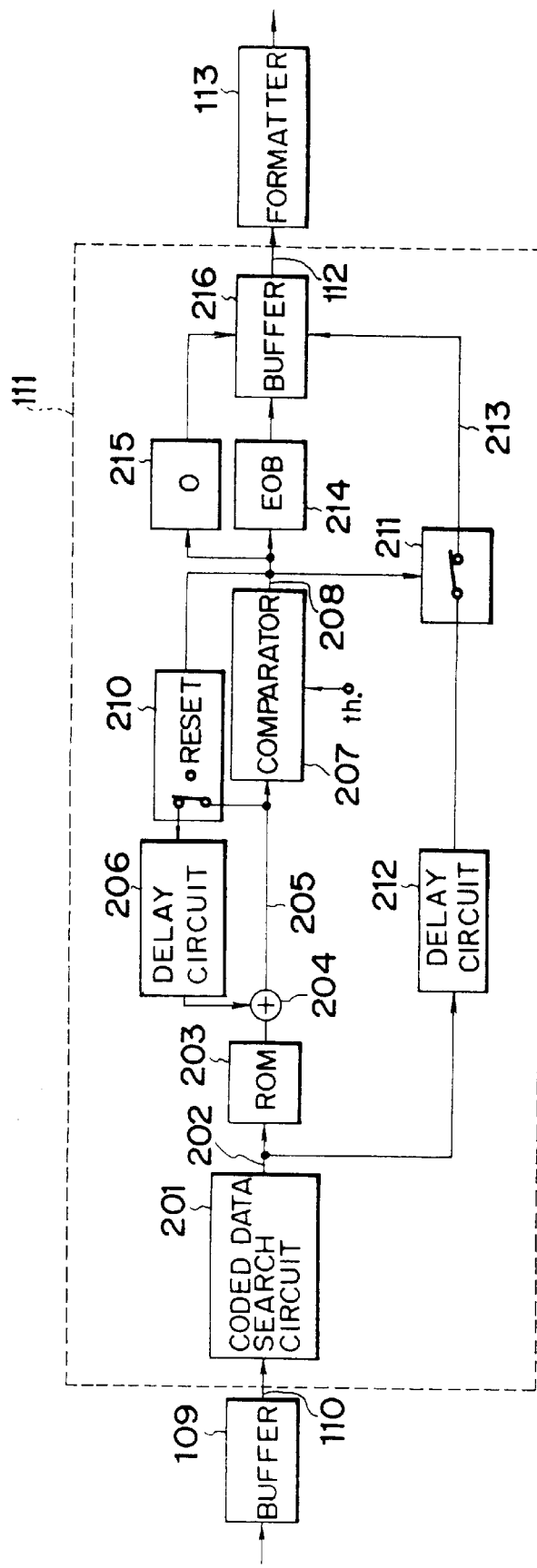
FIG. 5 shows a block diagram of a code quantity control circuit in the first embodiment.

By using a code quantity control circuit 111 which is a feature of the present invention to cut away overflow data, the quantity of code generated is suppressed so that the deterioration of the image quality such as block distortion in decoding the image is prevented. In this manner, the image which is close to the original image can be reproduced. Referring to FIG. 5, the present method is now explained.

FIG. 5 shows a block diagram of a detailed construction of the code quantity control circuit 111. In FIG. 5, the encoded data 110 in the code quantity control block sorted in the buffer 109 is sequentially read, one code word at a time, for each block by an encoded data search circuit 201, as shown in FIG. 6.

Figure 6:
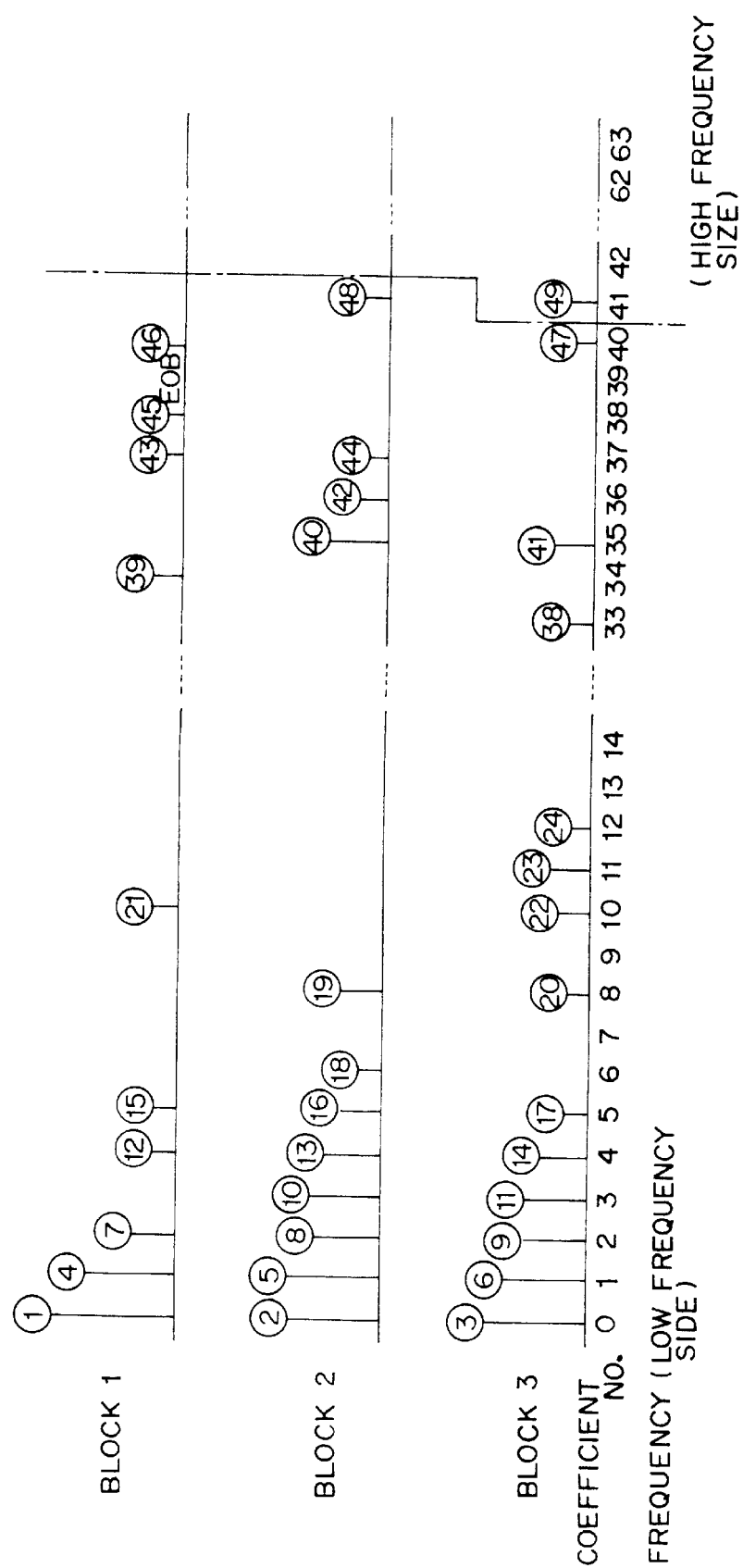
FIG. 6 illustrates an order of rearrangement of encoded data in a code quantity control block to conduct the code quantity control in the first embodiment.

In FIG. 6, an abscissa represents an order of coefficients rearranged in each block from the low frequency end to the high frequency end, and an ordinate represents a magnitude of an orthogonal conversion coefficient representing each frequency component. FIG. 6 shows a configuration in which one code quantity control block consists of three orthogonal conversion blocks.

As shown in FIG. 2 for each block, the run-length Huffman encoded data arranged from the low frequency end to the high frequency end is read from each block in sequence for the data of the same frequency component.

Since the encoded data is the combination of the run length and the significant coefficients, the reading of the code is limited to an area of components where the significant coefficients are present. They are shown by circled numbers starting from the low frequency end as shown in FIG. 6.

The encoded data 202 sequentially read is replaced by code quantity data by using a ROM table 203. The code quantity data are sequentially added by using an adder 204 and a delay circuit 206. The accumulated total code quantity 205 is compared by a comparator 207 with a threshold th corresponding to the code quantity defined by the format, and when it reaches the threshold th, the comparator 207 generates a control signal 208.

In response to the control signal 208, the feed of the encoded data 202 which has heretofore been sent to the buffer 216 through the delay circuit 212 is stopped by a switch 211 at the data immediately before the overflowing data (the 48-th read data in FIG. 6) and an EOB code is added by an EOB code addition circuit 214 and zeros are filled in a blank area by a zero filling circuit 215. When the control signal 208 is applied to a reset circuit 210, the accumulation by the adder 204 is reset.

Figure 7A:
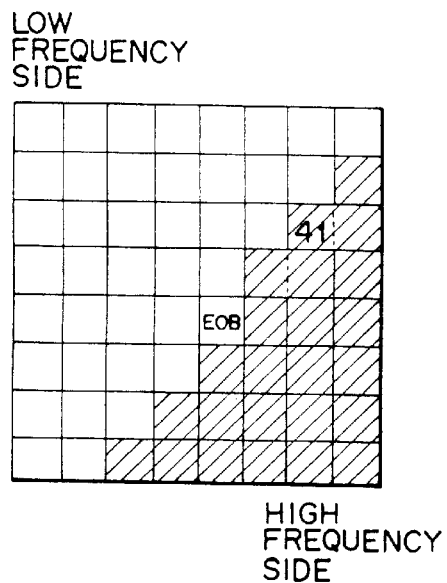
FIGS. 7A to 7C illustrates data which will be deleted when the code quantity control is conducted by the image encoding apparatus of the first embodiment in the code quantity control block constructed as shown in FIG. 6.
Figure 7B:
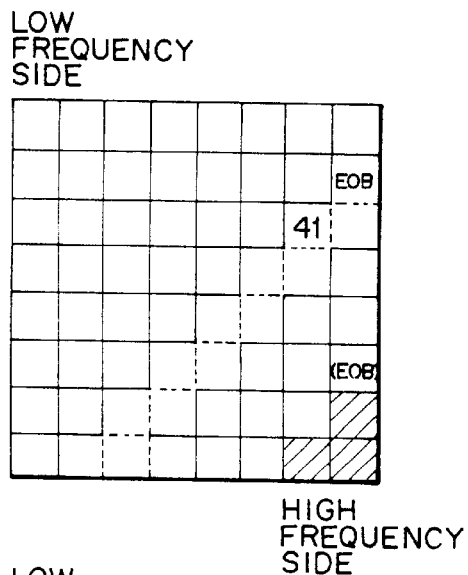
Figure 7C:
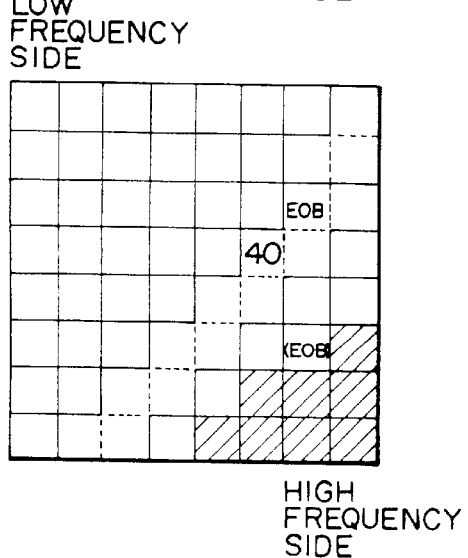

In the present method, as shown in FIG. 7A (corresponding to the first block), FIG. 7B (corresponding to the second block) and FIG. 7C (corresponding to the third block), of the overflow of the encoded data representing the frequency components of the blocks in the code quantity control block, the high frequency components which less affect to the visual sense of human being are deleted to suppress the code quantity to the capacity of the format. Yet, the substantially same frequency components of data in the orthogonally converted blocks can be deleted.

In FIGS. 7A to 7C, the coefficients shown in the hatched area of blocks sectioned by solid lines represent those coefficients which will be zero coefficients following to the last significant coefficient when they are rearranged in the orthogonal conversion block from the low frequency end to the high frequency end. The coefficients in the high frequency region in the orthogonal conversion blocks sectioned by the broken lines represent those coefficients which will be deleted by the code quantity control method of the present invention. The numbers in each block correspond to the numbers of data shown in FIG. 2 prior to the addition of the EOB by the present code quantity control method.

The encoded data 112 having the code quantity controlled is rearranged to fit to the format for the transmission or recording by a formatter 113 and the formatted data is outputted from an output unit 116.

A control method for the overflow when the code quantity control block comprises a block representing a luminance signal and a block representing a color difference signal is explained below.

It is assumed that one code quantity control block comprises six orthogonally converted blocks, that is, four orthogonally converted blocks $Y_1-Y_4$ representing luminance signal components and two orthogonally converted blocks $P_r$ and $P_b$ representing color difference components. The configuration of the code quantity control circuit is same as that shown in FIG. 5.

Figure 8:
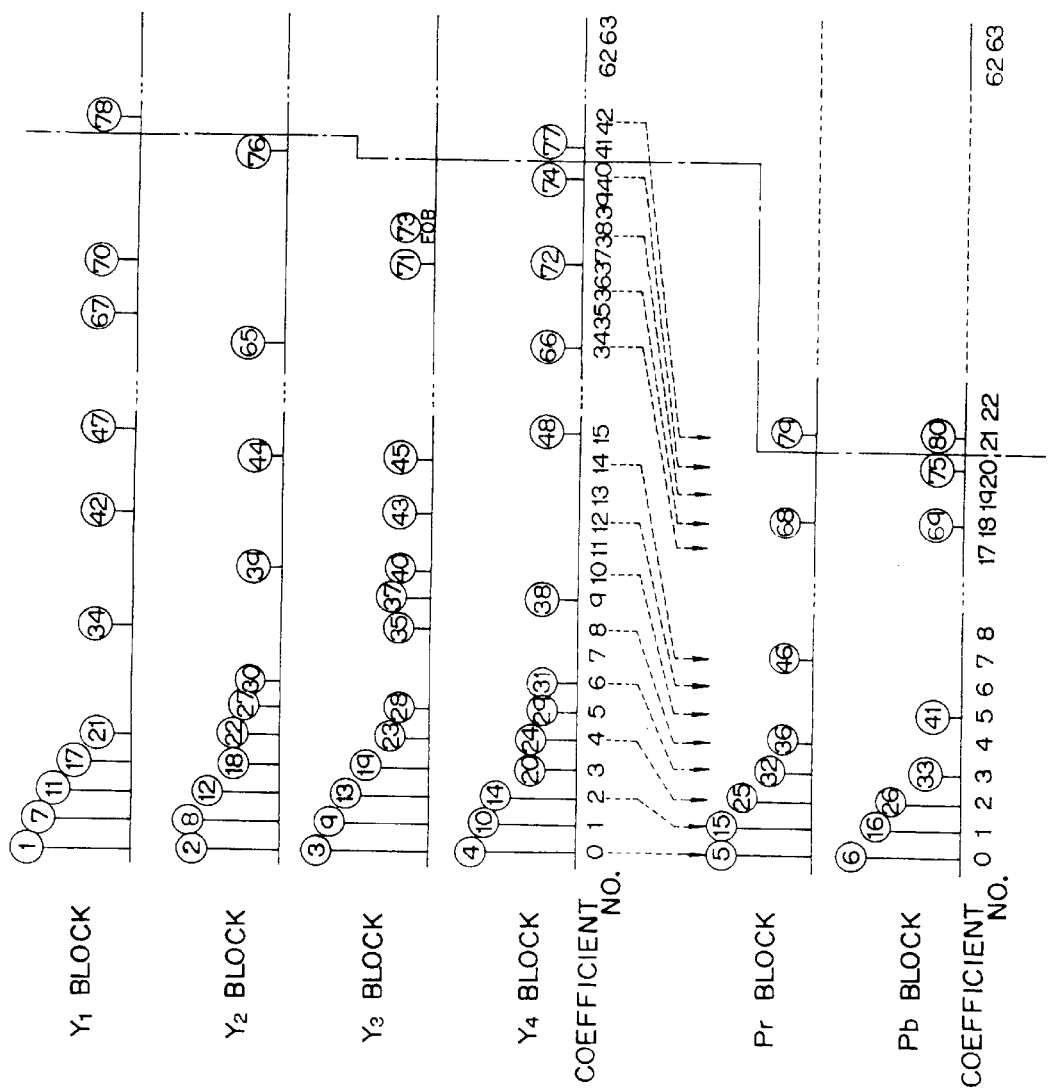
FIG. 8 illustrates an order of rearrangement of encoded data in the code quantity control block in order to conduct the code quantity control in the first embodiment.

In FIG. 8, an abscissa represents an order of coefficients rearranged in each block from the low frequency end to the high frequency end in the order shown in FIG. 2, and an ordinate represents a magnitude of orthogonal conversion coefficient representing the frequency component.

In FIG. 8, one code quality control block comprises six orthogonally converted blocks, that is, four orthogonally converted blocks $Y_1-Y_4$ representing the luminance signal components and two orthogonally converted blocks $P_r$ and $P_b$ representing the color difference components.

The run-length Huffman encoded data arranged in each block from the low frequency end to the high frequency end is sequentially read from respective blocks for the data having the same frequency component.

Since the encoded data is the combination of the zero's run length and the significant coefficients, the reading is limited to an area where the significant coefficients are present. This is sequentially conducted in the order of circled numbers as shown in FIG. 8 from the low frequency end.

In order to weight in reducing the code quantity while taking the visual sense of human being into consideration, the frequency components of the blocks $P_r-P_b$ representing the color difference components which less affect to the visual sense are read once while the frequency components of the blocks $Y_1-Y_4$ representing the luminance signal components which more affect to the visual sense are read twice.

The ratio between the read signals represents the weighting to the respective signal components in the code quantity control. In the present embodiment, the ratio of the luminance signal Y/the color difference signal $P_r$/the color difference signal $P_b$ is 2/1/1. Alternatively, the color difference signal $P_r$ and $P_b$ weighted to 4/2/1.

In this manner, the sequentially read encoded data 202 is replaced by the data of the code quantity by using the ROM table 203. The data of the code quantity is sequentially added by using the adder 204 and the delay circuit 206. The accumulated total code quantity 205 is compared by the comparator 207 with the threshold th which fits to the code quantity defined by the format and the comparator 207 generates a control signal 208.

In response to the control signal 208, the feed of the encoded data 202 which has heretofore been sent to the buffer 216 through the delay circuit 212 is stopped at the data which is immediately before the overflowing data (the 76-th read data in FIG. 4), an EOB is added by the EOB addition circuit 214, and zeros are filled in the blank area by the zero filling circuit 215. When the control circuit 208 is applied to the reset circuit 210, the accumulation by the adder 204 is reset.

Figure 9:
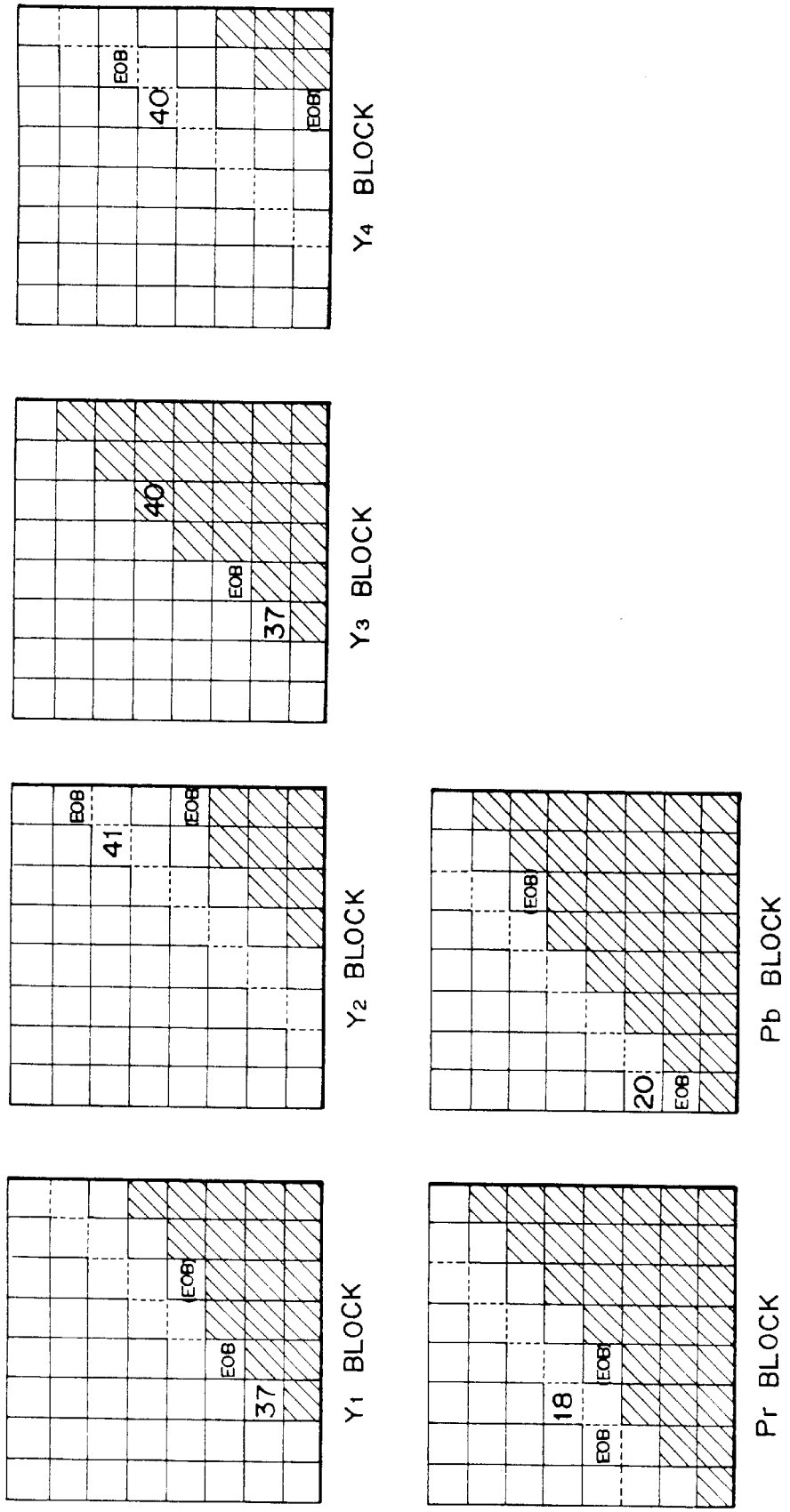
FIG. 9 illustrates data which will be deleted when the code quantity control is conducted by the image encoding apparatus of the first embodiment in the code quantity control block constructed as shown in FIG. 8.

In the present method, as shown in FIG. 9, of the overflow of the encoded data representing the frequency components of the respective blocks of the code quantity control block, the high frequency region which less affect to the visual sense of human being is deleted to suppress the code quantity within the capacity of the format.

In FIG. 9, the coefficients in the hatched area in the blocks sectioned by the solid lines represents those coefficients which will be zero coefficients following to the last significant coefficient when they are arranged in the orthogonally converted block from the low frequency end to the high frequency end. The high frequency region of the coefficients in the orthogonally converted blocks sectioned by the broken lines represent those coefficients which will be deleted by the code quantity control method of the present embodiment.

The numbers in the blocks correspond to the numbers of data in FIG. 2 before the addition of the EOB by the code quantity control method of the present embodiment. In the block $Y_3$, two numerals are shown. While the EOB should be added following to the 40-th data in the above code quantity control method, the EOB is added following to 37-th data in the input step of the data to the control circuit 111.

When the total code quantity is to be calculated, the encoded data representing the luminance components which more affect to the visual sense of human being is read up to higher frequency components than the encoded data representing the color difference components is read. Accordingly, the code quantity control which fits to the visual sense characteristic is attained.

In addition, the data of the substantially same frequency component in the respective blocks are deleted.

The encoded data 112 having the code quantity controlled is rearranged by the formatter 113 to fit to the format for the transmission or recording.

As described above, when the code quantity control is conducted by using the image encoding apparatus of the first embodiment, the encoded data representing the frequency component in the high frequency region which are deleted by the overflow are substantially uniform among the blocks in the code quantity control block, and the deletion of the high frequency components which fits to the visual sense characteristic of human being is attained. Accordingly, the occurrence of the deterioration of the image quality such as block distortion of image after the decoding of the encoded data is reduced and the reproduction of the image which is close to the original image after the decoding of the transmitted or recorded image is attained.

A second embodiment of the image encoding apparatus of the present invention is now explained with reference to the drawings.

Figure 10:
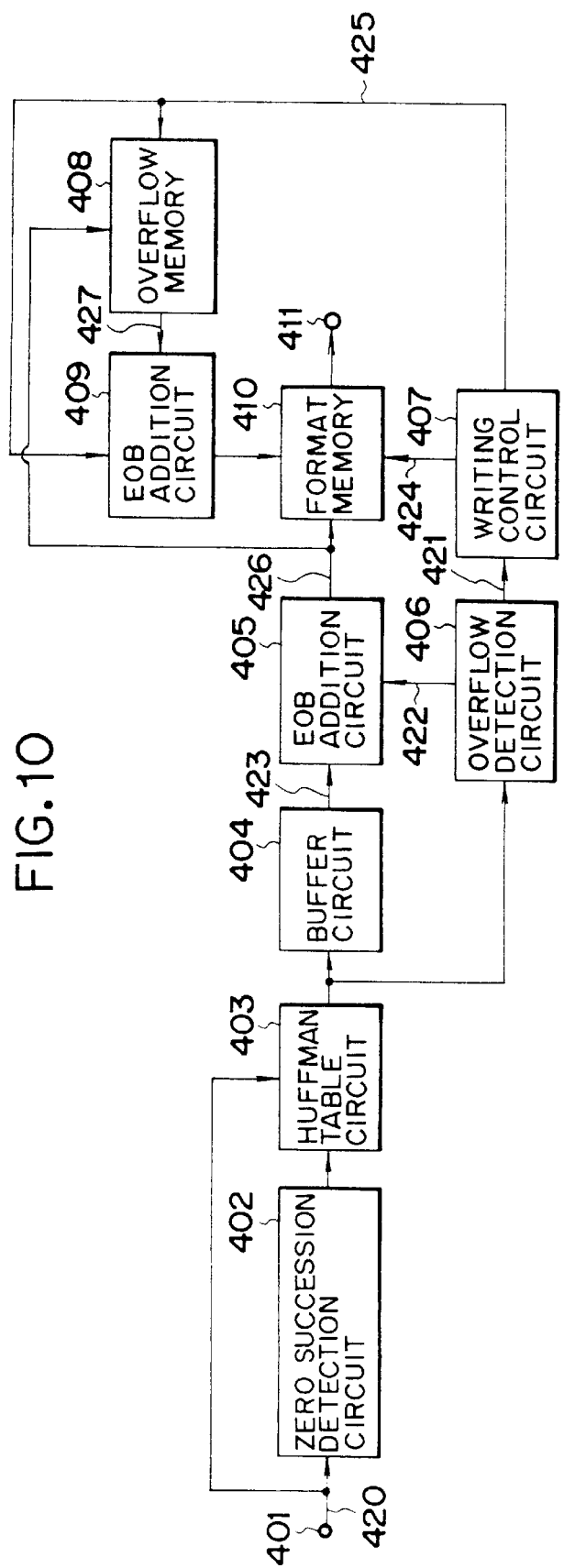
FIG. 10 shows a block diagram of a variable length encoding circuit in accordance with a second embodiment of the present invention.
Figure 11:
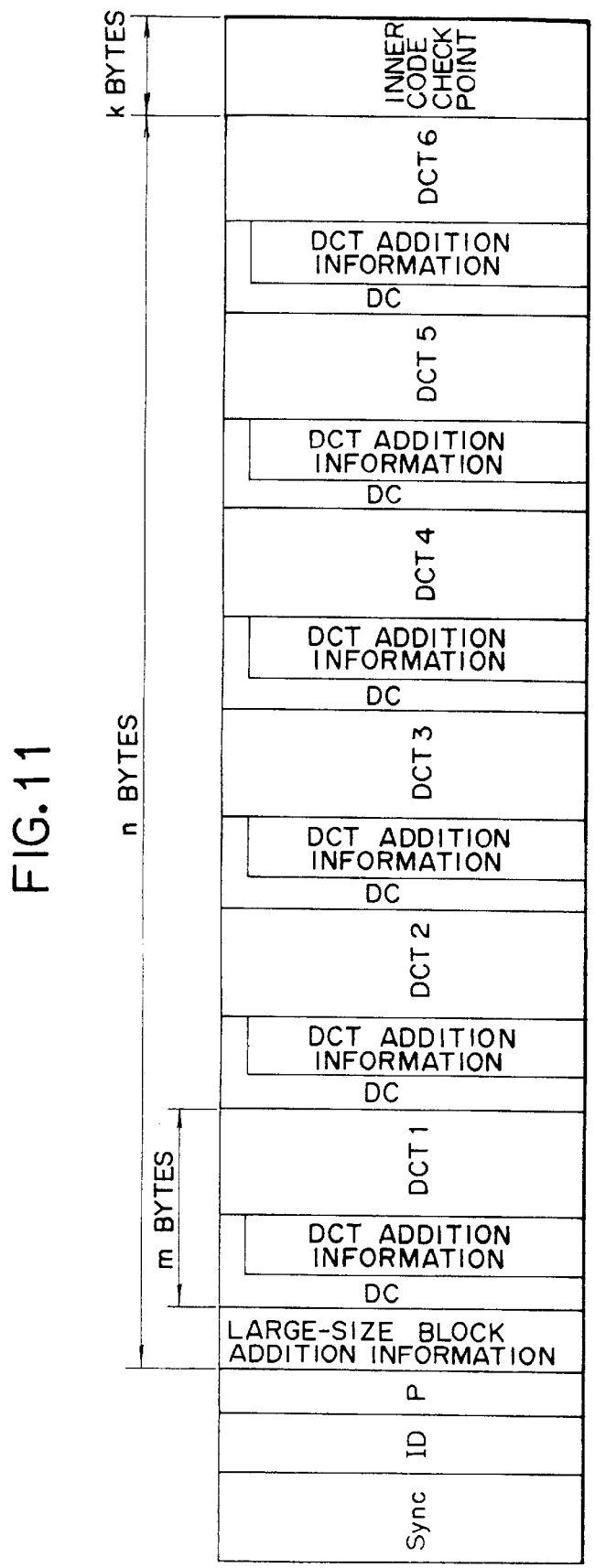
FIG. 11 illustrates a sink block of a transmission format in the second embodiment.
Figure 12:
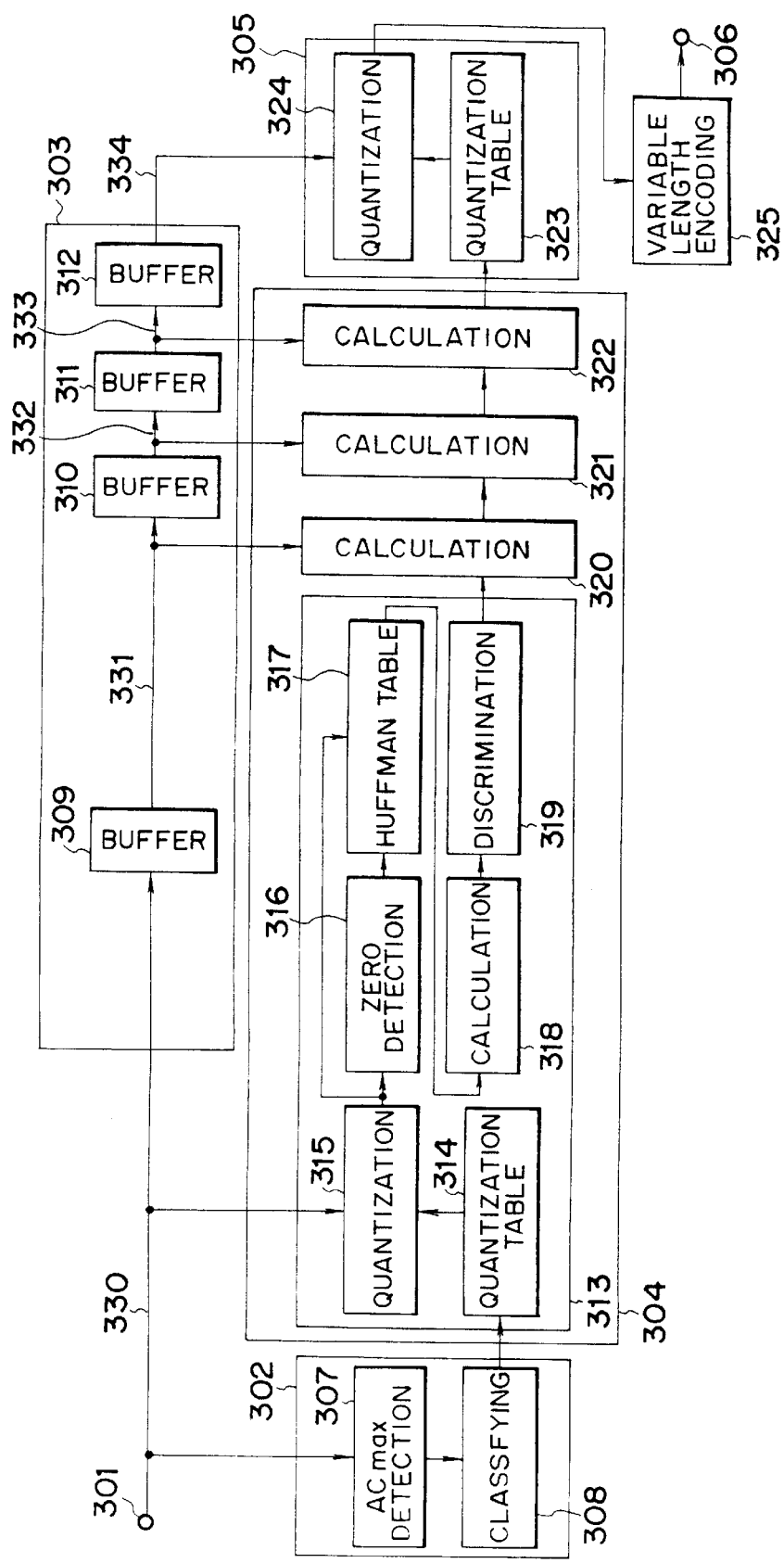
FIG. 12 shows a block diagram of an encoding apparatus of the second embodiment.

FIG. 10 shows a block diagram of a variable length encoding circuit in accordance with the second embodiment of the present invention. FIG. 11 shows a sink block of a transmission format in the second embodiment. FIG. 12 shows a block diagram of a configuration of an encoding apparatus in the second embodiment.

The input image signal is grounded into small blocks of 8 pixels (horizontal)×8 pixels (vertical), which are two-dimension DCT converted, and 30 such DCT blocks are formed into a large block to conduct the constant information quantity control. Specifically, where $Y/C_r/C_b$ of the NTSC component signal is sampled at a ratio of 4/1/1, the block (hereinafter referred to as a macro block) comprises four luminance signal (Y) DCT blocks and one color difference signal ($C_r$, $C_b$) DCT block.

In the present embodiment, five macro blocks are sampled from locations separated on the screen to form a large block to conduct the constant information quantity control. As shown in FIG. 11, the encoded data having the information quantity controlled is formatted by using five sync blocks each divided into six DCT areas corresponding to the macro blocks.

Referring to FIG. 12, an operation of the present embodiment is now explained. The signal applied from the input terminal 301 has the number of samples of the image signal to select 30 DCT blocks with any rule to one frame of data so that they formed into a large block. Further, each large block is subdivided to small blocks each comprising 8×8 pixels. The two-dimension DCT conversion is applied to each small block and 64 coefficients in each small block are rearranged starting from the low frequency component. The conversion coefficients 330 of the input signal are sequentially delayed by a buffer circuit 303 comprising buffer circuits 309, 310, 311 and 312 for each large block and supplied to a sort circuit 302.

Figure 13:
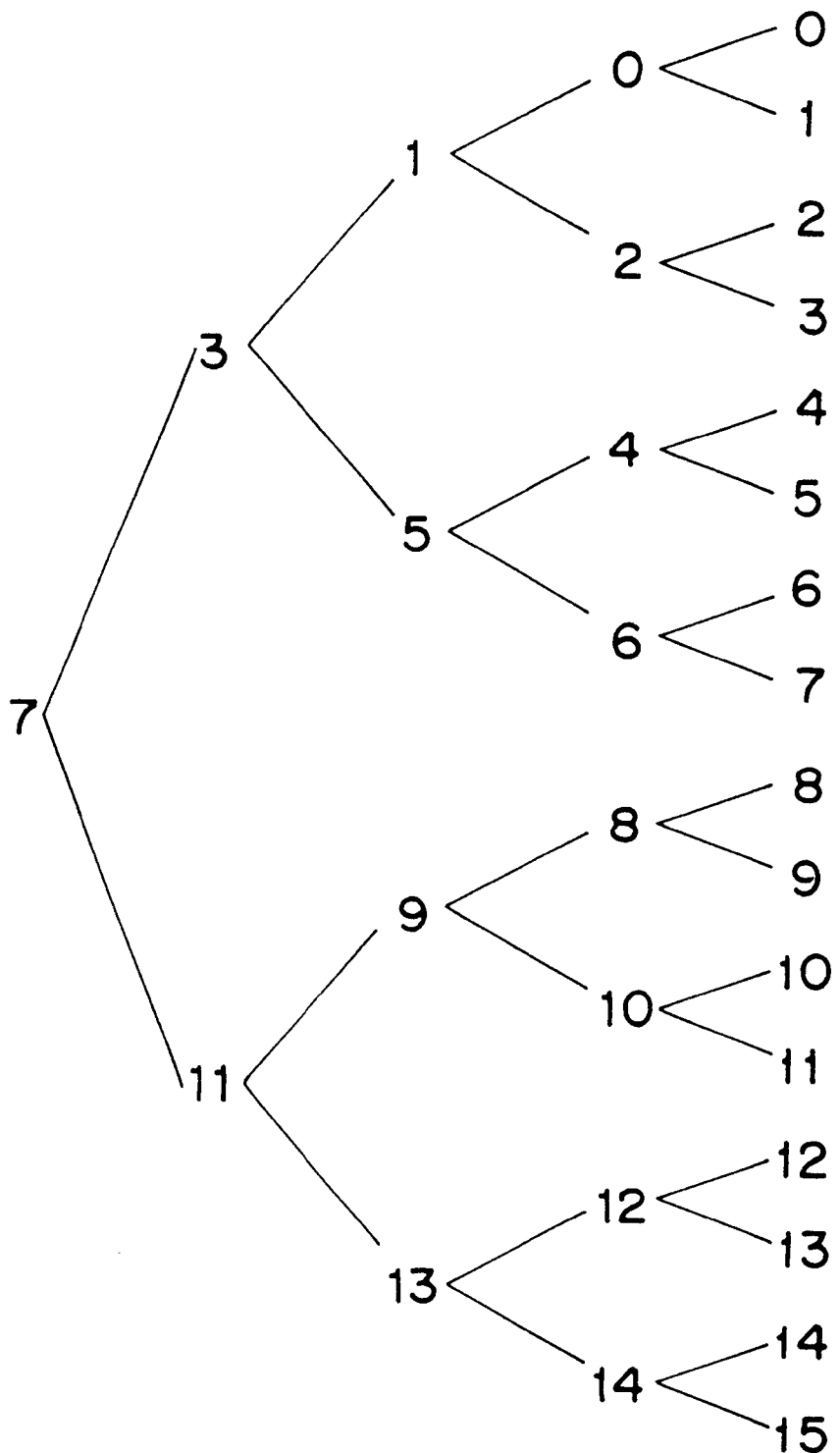
FIG. 13 illustrates binary search of quantized numbers in the second embodiment.

The sort circuit 302 determines a maximum amplitude of the 63 coefficients excluding DC component by an ACmax detection circuit 307 for each small block and classifies them into four classes in accordance with the maximums by a classify circuit 308. Then, a binary search method for the quantized number shown in FIG. 13 is used to calculate an estimation of the code quantity by a code quantity estimate circuit 304 comprising four stages of calculation circuits 313, 320, 321 and 322. Since an identification code (EOB) is added following to the last significant coefficient after the quantization of each small block and the remaining coefficients (all coefficients are zero) are not transmitted, the estimation of the information quantity take it into consideration. FIG. 13 illustrates binary search when 16 quantized numbers 0–15 are involved.

Applied to a quantization table circuit 314 are four class information determined by the sort circuit 302 and the $Y/C_r/C_b$ identification signal. In accordance with a table for selecting the quantization table as shown in FIG. 14, the quantization table T0–T3 as shown in FIGS. 15 to 18 is selected, and the quantization step selected for the quantization No. 7 by the quantization table circuit 314 is sent to a quantizer 315 for each of four divided bands of the small block.

Each table meets a relation of $T0 \geq T1 \geq T2 \geq T3$ for the information quantity. Each table comprises 16 quantized numbers 1–15 to divide the coefficient area after the orthogonal conversion into bands 1–4 to form a two-dimension table.

The quantizer 315 quantizes the conversion coefficient 330 by the quantization step sent from the quantization table circuit 314 and supplies it to a zero detection circuit 316 for detecting consecutive zeros and a Huffman table circuit 317, and a run length after two-dimension Huffman encoding by the run length and the amplitude is outputted to a counter 318.

The counter 318 accumulates the code quantity after the Huffman encoding for each large block, and a discrimination circuit 319 compares it with a predetermined information quantity.

A calculation circuit 320 estimates the code quantity of the large block by selecting the quantization table for each small block depending on the result of the preceding stage calculation circuit 313, for the conversion coefficient 331 having the delay time for the estimation of the code quantity adjusted by the buffer circuit 309, for the quantization No. 11 when the predetermined information quantity is exceeded as shown in FIG. 13, and for the quantization No. 3 when it is not exceeded, and the estimation is compared with the predetermined information quantity to determine the quantization No. of the succeeding stage. In the calculation circuits 321 and 322, similar calculations are conducted as shown in FIG. 5 for the conversion coefficients 332 and 333 to determine the quantization No. which is closest to the predetermined information quantity without exceeding it, and it is supplied to the quantization circuit 305. The quantization table circuit 323 outputs the quantization step to the quantizer 324 by the determined quantization No., the class information and the identification signal Y/$C_r$/$C_b$.

Applied to the quantizer 324 is the conversion coefficient 334 having the delay time for the code quantity estimation adjusted by the buffer circuit 303 to conduct the final quantization of the conversion coefficient 334. Then, the variable length encoding such as two-dimension Huffman encoding is conducted by the variable length encoding circuit 325 and it is outputted from an output terminal 306.

Referring to FIG. 10, an operation of the variable length encoding circuit 325 is explained. The quantized data 420 supplied from an input terminal 401 is counted by a consecutive zeros detection circuit 402 for the consecutive zero coefficients, and the resulting count together with the quantized data 420 are sent to a Huffman table circuit 403. The Huffman table circuit 403 comprises a ROM and it supplies the Huffman code encoded by the run length and the amplitude by using the two-dimension table to a buffer circuit 404 and an overflow detection circuit 406.

The overflow detection circuit 406 accumulates the number of code words and the number of bits exceeding the transmission area (m bytes in FIG. 11) corresponding to the DCT block, for each DCT block and accumulates the number of bits exceeding the information quantity of 30 DCT block each consisting of m×30 bytes, and supplies the accumulation signal 421 to a write control circuit 407. In addition, it detects the last significant coefficient for each DCT block and outputs a control signal 422 to an EOB addition circuit 405. Namely, the EOB addition circuit 405 is controlled to add the identification code (EOB) following to the last significant coefficient for each DCT block to the encoded data 423 having the delay for the 30 DCT blocks applied by the buffer circuit 404.

The write control circuit 407 outputs to a format memory 410 a control signal 424 for writing encoded words of the DCT block having the information quality of smaller than m bytes and encoded words of smaller than m bytes of the DCT block having the information quantity exceeding m bytes, into a format memory 410 mapped in accordance with a transmission format shown in FIG. 11, for each encoded word. It also outputs to an overflow memory 408 a control signal 425 for writing the remaining encoded words of the DCT block having the information quantity exceeding m bytes into the overflow memory 408 for each bit.

Further, the write control circuit 407 accumulates the information quantity from the last encoded word of the DCT block exceeding m bytes. The accumulation of the information quantity is conducted until the overflown information quantity is exceeded for every 30 DCT blocks. In order to permit the uniform cut-away of the encoded word at the DCT block which exceeds m bytes, a timing to add the EOB is outputted to the EOB addition circuit 409 at a timing of the transfer of the data written in the overflow memory 408 to the format memory 410.

The encoded data 426 having the EOB added by the EOB addition circuit 405 is written into the format memory 410 and the overflow memory 408. It is written into 30 DCT block as a unit by the control of the write control circuit 407. In the writing to the format memory 410, large block addition information is written for each large block in accordance with a format shown in FIG. 11, and a DC coefficient, DCT addition information and an AC coefficient are sequentially written for each small block in a frequency sequence from the low frequency end to the high frequency end.

Then, the encoded data 427 read from the overflow memory 408 is applied with the EOB by the EOB addition circuit such that the information quantity is smaller than m×30 bytes. Then, they are sequentially loaded, bit by bit, to a vacant area of the format area mapped in accordance with the transmission format stored in the format memory 410. The data formatted for the transmission in the format memory 410 is read in the order of transmission and outputted from the output terminal 411. Then, the sync and ID information is added and it is sent to a transmission line.

Since the transmission of the encoded data which overflows the information quantity of the small block area is eliminated from the last encoded word, the transmission is eliminated from the high frequency components of the DCT block having large information quantity.

In accordance with the second embodiment, when the information is written in the transmission format having the predetermined area for each small block while the control is made to attain the constant information quantity of the large block after the encoding, the encoded data which overflows the predetermined area corresponding to the small block is stored in the memory means for each small block, and the encoded data which overflows the predetermined area is measured for each large block, and transmission of the encoded data stored in the memory means is eliminated in accordance with the measured information quantity to maintain the constant information amount of the large block. Accordingly, the encoded data which are not transmitted when the data overflows is not concentrated in a particular block. As a result, when the image signal is encoded by using the encoding apparatus of the present invention, the concentration of the deterioration of the image quality in decoding is prevented and the deterioration of the image quality in reproduction is minimized.

In accordance with the second embodiment of the present invention, the weighting is made based on the characteristic of the distribution or encoding block and the transmission is eliminated from the high frequency component. Accordingly, when the image signal is encoded, the information may be cut away from the low frequency area which exhibits a low sensitivity in terms of the visual sense and the deterioration of the image quality due to the overflow of data is minimized.

While the preferred embodiments of the present invention have been shown and described, it should be understood that the present invention is not limited to those embodiments and various effective variations may be made without departing from the spirits of the invention. For example, while the information of the DCT block exceeding m bytes is uniformly cut away from the high frequency region in the second embodiment, the weighting may be made in accordance with the characteristic of blocks Y, $C_r$ and $C_b$ to delete the information from the frequency block halving a low sensitivity in terms of visual sensitivity.

In other words, the foregoing description of the embodiments has been given for illustrative purpose only and not to be construed as imposing and limitation in every respect.

The scope of the invention is, therefore, to be determined solely by the following claims and not limited by the text of the specifications and alterations made within a scope equivalent to the scope of the claims fall within the true spirit and scope of the invention.

What is claimed is:

1. An encoding apparatus, comprising:
   (a) an inputting unit, arranged to input image data including luminance component data and color component data;

(b) a block forming unit, arranged to divide the image data input by said inputting unit into blocks so as to divide the respective component data into the blocks separately; and (c) an encoding unit, arranged to encode the image data divided into the blocks by said block forming unit, said encoding unit including a code amount control unit, arranged to control a code amount of encoded data on a unit basis of a predetermined number of blocks, the predetermined number of blocks being formed so as to include at least one of the blocks of each type of component data, wherein said encoding unit includes a quantization unit, arranged to quantize the image data, and said code amount control unit controls the code amount using a quantization parameter of said quantization unit, and wherein, in a case that the code amount of encoded data of the predetermined number of blocks exceeds a predetermined amount, said code amount control unit deletes the encoded data of a high frequency component of the color component data at a higher ratio than the encoded data of a high frequency component of the luminance component data.

2. An encoding apparatus according to claim 1, wherein said encoding unit includes an orthogonal conversion unit, arranged to orthogonally convert the image data divided by said block forming unit.

3. An encoding apparatus according to claim 2, wherein said orthogonal conversion unit conducts DCT conversion.

4. An encoding apparatus according to claim 1, wherein the color component data is composed of two kinds of color difference component data.

5. An encoding apparatus according to claim 4, wherein the predetermined number of blocks are composed of four blocks of the luminance component data and two blocks of the color difference component data.

6. An encoding method comprising the steps of:

(a) inputting image data including luminance component data and color component data;

(b) dividing the image data input in said inputting step into blocks so as to divide the respective component data into the blocks separately; and (c) encoding the input image data divided into the blocks in said dividing step, said encoding step including a code amount control step of controlling a code amount of encoded data on a unit basis of a predetermined number of blocks, the predetermined number of blocks being formed so as to include at least one of the blocks of each type of component data, wherein said encoding step includes a quantizing step of quantizing the image data and said code amount control step includes a step of controlling the code amount using a quantization parameter of said quantizing step, and wherein, in a case that the code amount of encoded data of the predetermined number of blocks exceeds a predetermined amount, said code amount control step deletes the encoded data of a high frequency component of the color component data at a higher ratio than the encoded data of a high frequency component of the luminance component data.

7. An encoding method according to claim 6, wherein said encoding step includes an orthogonal conversion step of orthogonally converting the image data divided in said dividing step.

8. An encoding method according to claim 7, wherein said orthogonal conversion step includes DCT conversion.

9. An encoding method according to claim 6, wherein the color component data is composed of two kinds of color difference component data.

10. An encoding method according to claim 9, wherein the predetermined number of blocks are composed of four blocks of the luminance component data and two blocks of the color difference component data.

* * * * *

UNITED STATES PATENT AND TRADEMARK OFFICE
CERTIFICATE OF CORRECTION

| | |
|---|---|
| PATENT NO. | : 6,668,021 B2 |
| APPLICATION NO. | : 09/021267 |
| DATED | : December 23, 2003 |
| INVENTOR(S) | : Tetsuya Shimizu et al. |

It is certified that error appears in the above-identified patent and that said Letters Patent is hereby corrected as shown below:

COLUMN 1

Line 23, "is" should read --and is--; and
Line 36, "rearrange" should read --rearranges--.

COLUMN 2

Line 15, "to" should be deleted; and
Line 26, "contort" should read --control--.

COLUMN 5

Line 39, "to" (first occurrence) should be deleted; and
Line 45, "to" should be deleted.

COLUMN 6

Line 27, "to" should be deleted;
Line 30, "to" should be deleted;
Line 59, "affect to" should read --affects--; and
Line 64, "to" should be deleted.

COLUMN 7

Line 9, "to" should be deleted;
Line 10, "to" should be deleted; and
Line 15, "to" (first occurrence) should be deleted.

COLUMN 8

Line 2, "formed" should read --are formed--;
Line 20, "to" should be deleted; and
Line 23, "take" should read --takes--.

COLUMN 9

Line 32, "to" (first occurrence) should be deleted.

UNITED STATES PATENT AND TRADEMARK OFFICE
CERTIFICATE OF CORRECTION

PATENT NO. : 6,668,021 B2
APPLICATION NO. : 09/021267
DATED : December 23, 2003
INVENTOR(S) : Tetsuya Shimizu et al.

It is certified that error appears in the above-identified patent and that said Letters Patent is hereby corrected as shown below:

COLUMN 10

Line 56, "limitation" should read --limiting--; and
Line 60, "specifications" should read --specification,--.

Signed and Sealed this

Twentieth Day of January, 2009

JON W. DUDAS
*Director of the United States Patent and Trademark Office*